United States Patent

[11] 3,547,174

| [72] | Inventor | Iain C. Mills<br>Birmingham, England |
|---|---|---|
| [21] | Appl. No. | 741,439 |
| [22] | Filed | July 1, 1968 |
| [45] | Patented | Dec. 15, 1970 |
| [73] | Assignee | The Dunlop Company Limited<br>London, England<br>a British company |
| [32] | Priority | July 12, 1967 |
| [33] | | Great Britain |
| [31] | | No. 32056/67 |

[54] PNEUMATIC TIRE
3 Claims, 2 Drawing Figs.

[52] U.S. Cl. ..................................................... 152/209
[51] Int. Cl. ..................................................... B60c 3/00,
B60c 11/04
[50] Field of Search............................................ 152/209,
209D

[56] References Cited
UNITED STATES PATENTS

| 3,094,157 | 6/1963 | Klohn............................ | 152/209 |
| 3,286,756 | 11/1966 | Ellenrieder et al. ........... | 152/209 |
| 3,410,329 | 11/1968 | Bezbatchenko.............. | 152/209 |

Primary Examiner—Arthur L. La Point
Attorney—Stevens, Davis, Miller & Mosher

ABSTRACT: A pneumatic tire with improved cornering capacity and a reduced capacity to generate heat comprising a carcass and a tread having a pattern formed thereon, one-half of which to one side of a circumferential line is substantially similar to the pattern formed on the other side of the line and the said line being axially offset from the symmetrical midcircumferential plane of the carcass of which the following is a specification.

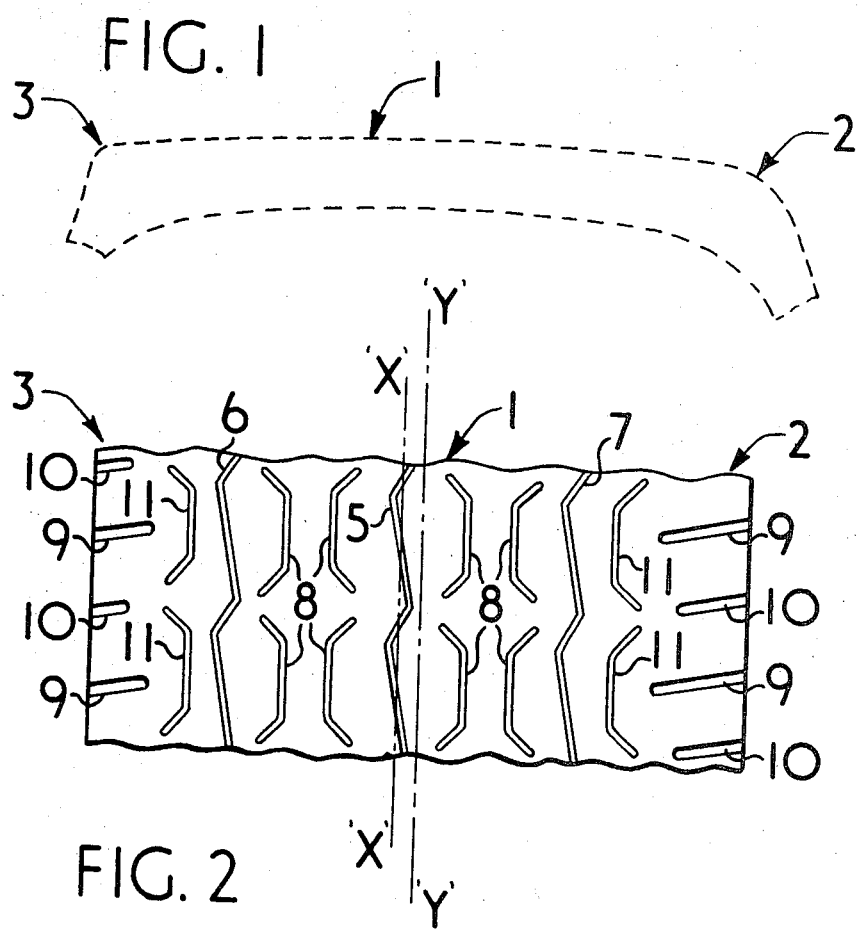

PNEUMATIC TIRE

This invention relates to pneumatic tires.

Pneumatic tires particularly those subjected to severe operating conditions, such as car racing, experience greater forces in one part or to one side of the tread than in the remainder so that an absolutely uniform tire and one having symmetrical shape and tread pattern would be subjected to more severe tread wear, due to these forces, in one part of the tire than in the remainder.

In addition, for example with car racing tires, one or either of the shoulders is subjected to high deflection under operating conditions, and this causes the development of high temperatures in the region of the affected shoulder.

It is an object of the invention to provide a tire which will provide more even wear and lower temperatures in operation despite the uneven forces to which the tire is subjected.

According to the invention a pneumatic tire comprises a carcass and a tread having a pattern formed thereon one half of which to one side of a circumferential line is substantially similar to the pattern formed on the other side of the said line and the said line being axially offset from the symmetrical midcircumferential plane of the carcass.

The tread may be provided with sharp edged shoulders or rounded shoulders, when the profile of the tire is viewed in cross section, or the tire may have a tread with one shoulder sharp edged and the other rounded. The offsetting of the tread pattern in this latter instance is in a direction away from the rounded shoulder.

The amount of axial offset of the tread pattern may be from .4 to 20 percent of the total width of tread measured transversely of the tread around the arch of tread curvature from shoulder to shoulder.

One embodiment of the invention will now be described by way of example with reference to the accompanying drawings wherein:

FIG. 1 shows an axial cross-sectional profile of a tire of the embodiment,

FIG. 2 shows a plan view of the tire shown in FIG. 1.

According to one embodiment a motorcar racing tire having a tread width of about 5¾ inches measured from one shoulder 2 to the other 3 around the very slightly outwardly arched curvature of the tread of the inflated tire, is provided with a sharp profiled shoulder 3 on the outwardly facing side and a comparatively round-profiled shoulder 2 on the inwardly facing side. The tread pattern 1 is of a form which is substantially a mirror image on one side of the symmetrical midcircumferential line "X–X" of the pattern to that on the other side of the said line "X–X" and the midcircumferential line "X–X" of the tread pattern is axially offset from the midcircumferential plane "Y–Y" of the carcass which is a radial plane disposed equidistantly between beads 4, by a distance of approximately 0.23 inches.

The tread pattern 1, itself, comprises a central zig-zag circumferential groove 5 and two similar circumferential grooves 6 and 7 disposed one at each side of the central groove 5, equidistantly therefrom, measured axially, the space between the three grooves being provided with a pattern of U-shaped grooves 8 disposed in circumferentially aligned back to back pairs, the base of each of the U-shaped grooves being flattened and aligned circumferentially. Axially outwardly of the axially outermost zig-zag grooves 6 and 7 there are disposed further similar U-shaped grooves 11 orientated similarly to the pairs of U-shaped grooves 8 and in axial alignment therewith. Each shoulder 2 is provided with alternately long and short grooves 9 and 10 respectively each disposed at the same angle of about 10° to an axial line.

Pneumatic tires of the type described in the embodiment of the invention are particularly advantageous when fitted to the wheels of vehicles which are provided with a negative camber. When such tires are fitted to said vehicles and driven in the straight ahead position, it is that shoulder of each tire which is located inwardly of the vehicle that suffers relatively more radial deformation and consequently heat generation in said shoulder is accelerated and may cause eventual tire failure. The provision of said shoulder with a rounded profile reduces said deformation and so extends the life of the tire. When such tires are fitted to said vehicles and driven in a cornering position, it is that shoulder and that side of the tread of each tire that is located outwardly of the vehicle that suffers the largest lateral forces and so the offsetting of the tread pattern and the provision of said shoulder with a sharp profile allows relatively more tread compound to contact the running surface and so absorb the said lateral forces, improving cornering adhesion.

I claim:

1. A pneumatic tire comprising a carcass and a tread having a pattern formed thereon which is uniformly divided, one-half thereof being to one side of a circumferential line and substantially similar to the pattern formed on the other side of the said line both tread halves having substantially the same radius of curvature, said line being axially offset from the symmetrical midcircumferential plane of the carcass, the tread being provided with one sharp edged shoulder and one round edged shoulder.

2. A pneumatic tire according to claim 1 wherein the said offsetting of the tread pattern with respect to the midcircumferential plane of the carcass is in a direction away from the rounded shoulder.

3. A pneumatic tire according to claim 1 wherein the axial offset of the tread pattern with respect to the midcircumferential plane of the carcass lies within the range 0.4 to 20 percent of the total surface width of the tread measured transversely of the tread around the arch of tread curvature from shoulder to shoulder.